US008622742B2

(12) United States Patent
Benko et al.

(10) Patent No.: US 8,622,742 B2
(45) Date of Patent: Jan. 7, 2014

(54) TEACHING GESTURES WITH OFFSET CONTACT SILHOUETTES

(75) Inventors: Hrvoje Benko, Seattle, WA (US);
Daniel J. Wigdor, Seattle, WA (US);
Dustin Freeman, Toronto (CA)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 12/619,584

(22) Filed: Nov. 16, 2009

(65) Prior Publication Data
US 2011/0117535 A1 May 19, 2011

(51) Int. Cl.
G09B 19/00 (2006.01)
G06F 3/00 (2006.01)

(52) U.S. Cl.
USPC .......................................... 434/118; 715/709

(58) Field of Classification Search
USPC .......... 434/118, 163, 173, 362; 715/709, 863
See application file for complete search history.

(56) References Cited

U.S. PATENT DOCUMENTS

| | | | |
|---|---|---|---|
| 6,307,544 B1* | 10/2001 | Harding | 715/709 |
| 6,802,717 B2* | 10/2004 | Castro | 434/169 |
| 6,984,208 B2 | 1/2006 | Zheng | |
| 7,249,950 B2* | 7/2007 | Freeman et al. | 434/155 |
| 7,340,077 B2 | 3/2008 | Gokturk et al. | |
| 7,565,295 B1 | 7/2009 | Hernandez-Rebollar | |
| 7,598,942 B2 | 10/2009 | Underkoffler et al. | |
| 8,147,248 B2 | 4/2012 | Rimas-Ribikauskas et al. | |
| 2006/0210958 A1* | 9/2006 | Rimas-Ribikauskas et al. | 434/362 |
| 2007/0177804 A1* | 8/2007 | Elias et al. | 382/188 |
| 2007/0201863 A1 | 8/2007 | Wilson et al. | |
| 2007/0262964 A1 | 11/2007 | Zotov et al. | |
| 2008/0052643 A1 | 2/2008 | Ike et al. | |
| 2008/0122803 A1 | 5/2008 | Izadi et al. | |
| 2008/0163130 A1 | 7/2008 | Westerman | |
| 2008/0178126 A1* | 7/2008 | Beeck et al. | 715/863 |
| 2008/0191864 A1* | 8/2008 | Wolfson | 340/524 |
| 2008/0192005 A1 | 8/2008 | Elgoyhen et al. | |
| 2008/0244468 A1* | 10/2008 | Nishihara et al. | 715/863 |
| 2009/0051648 A1 | 2/2009 | Shamaie et al. | |
| 2009/0143141 A1 | 6/2009 | Wells et al. | |
| 2009/0153289 A1 | 6/2009 | Hope et al. | |
| 2009/0178011 A1* | 7/2009 | Ording et al. | 715/863 |
| 2010/0104134 A1* | 4/2010 | Wang et al. | 382/103 |
| 2011/0320496 A1 | 12/2011 | Reid et al. | |

OTHER PUBLICATIONS

Agarwal, et al., "High Precision Multi-Touch Sensing on Surfaces using Overhead Cameras", Retrieved at <<http://research.microsoft.com/en-us/um/people/shahrami/papers/cslate2.pdf>>, Second Annual IEEE International Workshop on Horizontal Interactive Human-Computer System, 2007, pp. 197-200.

(Continued)

Primary Examiner — Peter Egloff
(74) Attorney, Agent, or Firm — Alleman Hall McCoy Russell & Tuttle LLP

(57) ABSTRACT

A method for providing multi-touch input training on a display surface is disclosed. A touch input is detected at one or more regions of the display surface. A visualization of the touch input is displayed at a location of the display surface offset from the touch input. One or more annotations are displayed at a location of the display surface offset from the touch input and proximate to the visualization, where each annotation shows a different legal continuation of the touch input.

16 Claims, 7 Drawing Sheets

(56) References Cited

OTHER PUBLICATIONS

Hodges, et al., "ThinSight: Versatile Multi-Touch Sensing for Thin Form-Factor Displays", Retrieved at <<http://delivery.acm.org/10.1145/1300000/1294258/p259-hodges.pdf?key1=1294258&key2=4336984521&coll=GUIDE&dl=GUIDE&CFID=56496022&CFTOKEN=78691673>>, UIST'07, Oct. 7-10, 2007, pp. 259-268.

Izadi, et al., "Going beyond the Display: A Surface Technology with an Electronically Switchable Diffuser", Retrieved at <<http://delivery.acm.org/10.1145/1450000/1449760/p269-izadi.pdf?key1=1449760&key2=8969094521&coll=GUIDE&dl=GUIDE&CFID=56524950&CFTOKEN=32131660>>, UIST'08, Oct. 19-22, 2008, pp. 269-278.

Freeman, et al., "ShadowGuides: Visualizations for In-Situ Learning of Multi-Touch and Whole-Hand Gestures", Retrieved at <<http://research.microsoft.com/en-us/um/people/benko/publications/2009/ShadowGuides_paper188.pdf>>, ITS '09, Oct. 7, 2009, pp. 8.

Bau, et al., "A Dynamic Guide for Learning Gesture-Based Command Sets", Retrieved at <<http://insitu.lri.fr/~bau/files/uist2008op.pdf>>, UIST'08, Oct. 19-22, 2008, pp. 10.

Grossman, et al., "Strategies for Accelerating On-Line Learning of Hotkeys", Retrieved at >>http://delivery.acm.org/10.1145/1250000/1240865/p1591-grossman.pdf?key1=1240865&key2=8401194521&coll=GUIDE&dl=GUIDE&CFID=55313597&CFTOKEN=92994945>>, CHI 2007, Apr. 28-May 3, 2007, pp. 1591-1600.

Tapia, et al., "Some Design Refinements and Principles on the Appearance and Behavior of Marking Menus", Retrieved at <<http://delivery.acm.org/10.1145/1300000/1294258/p259-hodges.pdf?key1=1294258&key2=4336984521&coll=GUIDE&dl=GUIDE&CFID=56496022&CFTOKEN=78691673>>, UIST '95, Nov. 14-17, 1995, pp. 189-195.

"GestureBar: Improving the Approachability of Gesture-based Interfaces", Retrieved at <<http://www.cs.brown.edu/people/acb/papers/p2269-bragdon.pdf, CHI 2009, Apr. 4-9, 2009, pp. 2269-2278.

Vogel, et al., "Shift: A Technique for Operating Pen-Based Interfaces Using Touch", Retrieved at <<http://www.patrickbaudisch.com/publications/2007-Vogel-CHI07-Shift.pdf>>, CHI 2007, Apr. 28-May 3, 2007, pp. 10.

Carenzi, et al., "Using Generic Neural Networks in the Control and Prediction of Grasp Postures", retrieved at <<http://www.dice.ucl.ac.be/Proceedings/esann/esannpdf/es2005-33.pdf, Proceedings—European Symposium on Artificial Neural Networks, Apr. 27-29, 2005, pp. 61-66.

Puranam, Muthukumar B., "Towards Full-Body Gesture Analysis and Recognition", retrieved at <<http://archive.uky.edu/bitstream/10225/221/finalreport.pdf>>, Jan. 2005, 75 Pages.

Malerczyk, Cornelius, "Dynamic Gestural Interaction with Immersive Environments", retrieved at <<http://wscg.zcu.cz/WSCG2008/Papers_2008/short/E02-full.pdf>>, Feb. 2008, 6 Pages.

* cited by examiner

TEACHING GESTURES WITH OFFSET CONTACT SILHOUETTES

BACKGROUND

Multi-touch input on display surfaces can be used in a variety of different applications. For example, computing systems with interactive display surfaces can be configured to utilize touch inputs as forms of user input to control system operation.

SUMMARY

The present disclosure describes touch input training on a display surface. A touch input is detected at one or more regions of the display surface, and a visualization of the touch input is displayed at a location of the display surface offset from the touch input. One or more annotations are displayed at a location of the display surface offset from the touch input and proximate to the visualization, where each annotation shows a different legal continuation of the touch input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Computing systems with display surfaces can be configured to detect contact-shape touch input on the display surfaces. Contact-shape touch input may include one or more regions of one or more objects in contact with the display surface. For example, contact-shape touch input may include one or more regions of one or more hands in contact with the display surface. Such computing systems can be controlled by one or more users at least in part by touch input on the display surface. For example, a user may touch the display surface with one or both hands and complete a hand gesture while maintaining contact with the surface to move or resize an object displayed on the surface. As another example, a user may tap one or more fingers on the display surface while performing a hand gesture in contact with the surface to carry out various computing system actions associated with the hand gesture. For example, a user may resize an object by sliding two fingers in contact with the surface together.

In such computing systems, the mapping of contact-shape touch input to system actions may be complex or unfamiliar to inexperienced or infrequent users. For example, there may be many different multi-touch hand gestures for a user to learn in order to effectively interact with such a system. Multi-touch computing system input may be difficult for a user to learn and may prevent the user from effectively using such a system.

By providing a contact-shape touch input training system that displays a guide at a location of the display surface offset from the touch input and within the context of a user's current action, the transition in user skill level from novice to expert use may be eased while providing system usability to users at all skill levels.

Figure 1:
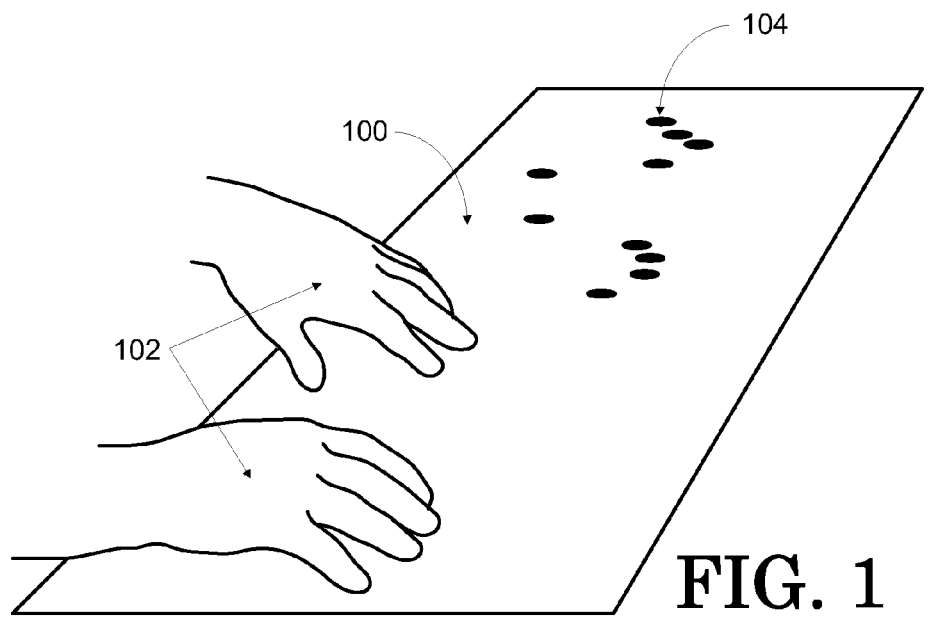
FIG. 1 shows an example of multi-touch user input on a display surface with a visualization of the input offset from the touch input.

FIG. 1 shows an example display surface 100 on which a contact-shape touch input 102 is executed. Display surface 100 can be configured to detect contact-shape touch input, e.g., touch input by one or more regions of one or more user's hands. The example of contact-shape touch input shown in FIG. 1 includes regions of a user's fingers and thumbs in contact with the display surface 100. An example visualization 104 of the contact-shape touch input 102 is shown as black regions at a location on the display surface offset from the touch input. The visualization 104 is provided as feedback of the regions of the user's hands in contact with the surface, e.g., silhouettes of the tips of the fingers and thumbs in contact with the surface offset from the contact-shape touch input 102. The visualization is not blocked from view by the hands of the user making the contact because the visualization 104 is displayed at a location of the display surface offset from the contact.

Figure 2:
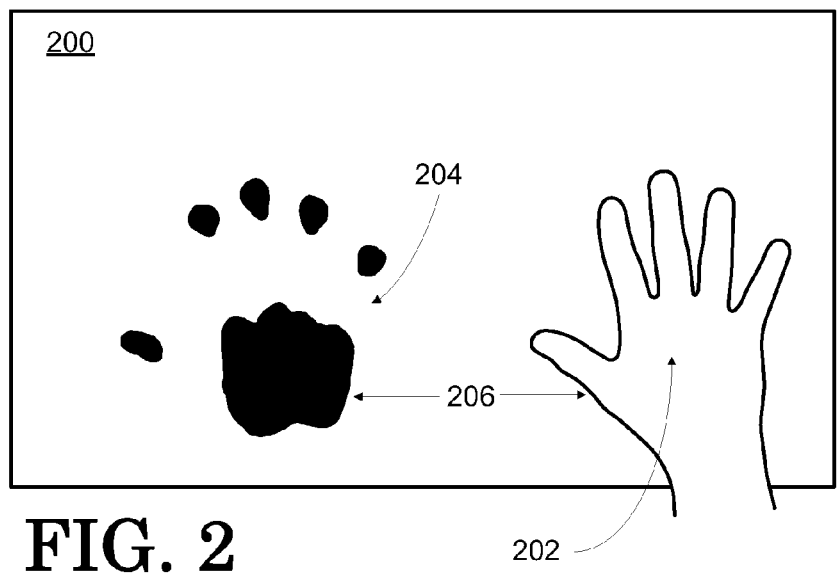
FIG. 2 shows another example of multi-touch user input on a display surface with a visualization of the input offset from the touch input.

FIG. 2 shows another example of a contact-shape touch input 202 on a display surface 200. In this example, the contact-shape touch input includes multiple regions of a user's hand, e.g., regions of the fingers and regions of the palm of the user's hand. A visualization 204 of the contact regions of the user's hands is displayed at a location of the display surface offset from the touch input.

The offset 206 is shown in FIG. 2 as a distance and direction from the contact-shape touch input 202 to the visualization 204. The distance and/or direction of the offset may depend on a variety of operating conditions of the computing system and/or display surface. For example, the offset distance and/or direction may be fixed relative to the touch input. In another example, the offset distance and/or direction may change depending on a location of the touch input on the display surface or depending on locations of one or more objects displayed on the surface. For example, if the touch input is adjacent to an edge of the display surface, the visualization may be displayed at a location of the display surface offset from the touch input toward an opposing edge of the surface. In another example, the visualization may be displayed in a dedicated visualization region of the display surface so as to not interfere with other objects displayed on the surface.

Some computing systems may be able to detect hover input. In other words, user input may be detected before the input actually touches the display surface. For example, vision based touch systems that use infrared or visible light cameras may be able to view a user hand that is a short distance above the display surface. It is to be understood that the visualizations and annotations described herein with reference to touch input also apply to hover input.

By providing a visualization of the touch or hover input at a location on the display surface offset from the touch or hover input, occlusion of the visualization by the touch or hover input may be avoided. Furthermore, the offset visualization provides direct feedback to the user on how the contact-shape touch or hover input is observed by the system. For example, a user may be provided with feedback as to what regions of the hands are perceived by the system as being in contact with or hovering above the surface. For example, users may be made aware of fingers or parts of their hands unintentionally touching the surface.

In addition to offset visualizations of a user's touch or hover input, the computing system may provide real-time assistance in the form of annotations proximate to the visualizations. In other words, visualizations of the user's current hand pose as interpreted by the system (feedback) are combined with annotations including hand pose completion paths for completing the gesture (feedforward).

Annotations proximate to the visualizations provide information describing different legal continuations associated with a given touch or hover input. Legal continuations of a touch or hover input are possible continuations of a touch or hover input that are recognizable and/or interpretable by the computing system, e.g., as system actions. For example, annotations may include information indicating a direction and/or path a continuation of the touch or hover input should move to execute a legal continuation of the touch or hover input. As such, the annotations may include arrows or paths to guide the user. In another example, the annotations may include one or more images simulating a touch or hover input at a corresponding one or more successive time frames to indicate a legal continuation of the touch or hover input. For example, one or more snapshots of a hand posture may be displayed at different locations of the display surface proximate to the visualization in order to guide a user to perform a hand gesture. Such arrows, paths, images, or other visual elements may be spatially related to the offset visualization of the touch contact points.

Figure 3A:
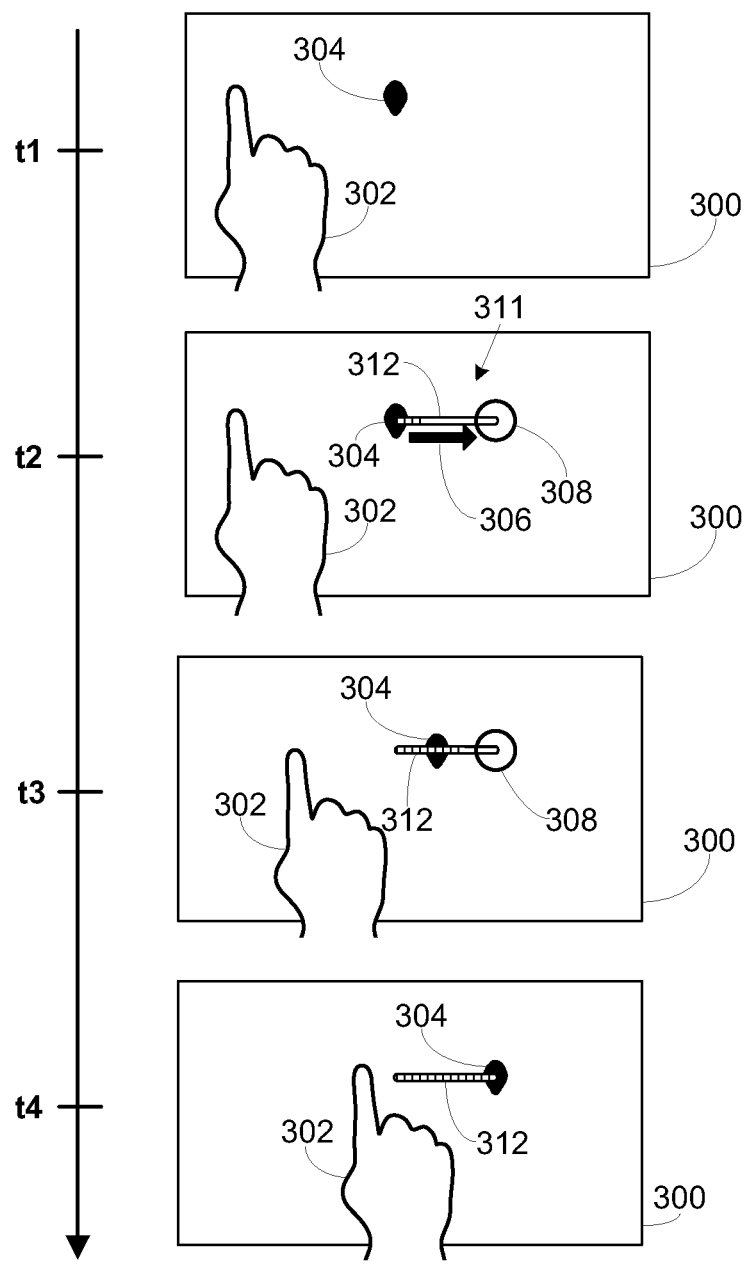
FIGS. 3A and 3B show examples of annotations proximate to an offset visualization of a touch input.
Figure 3B:
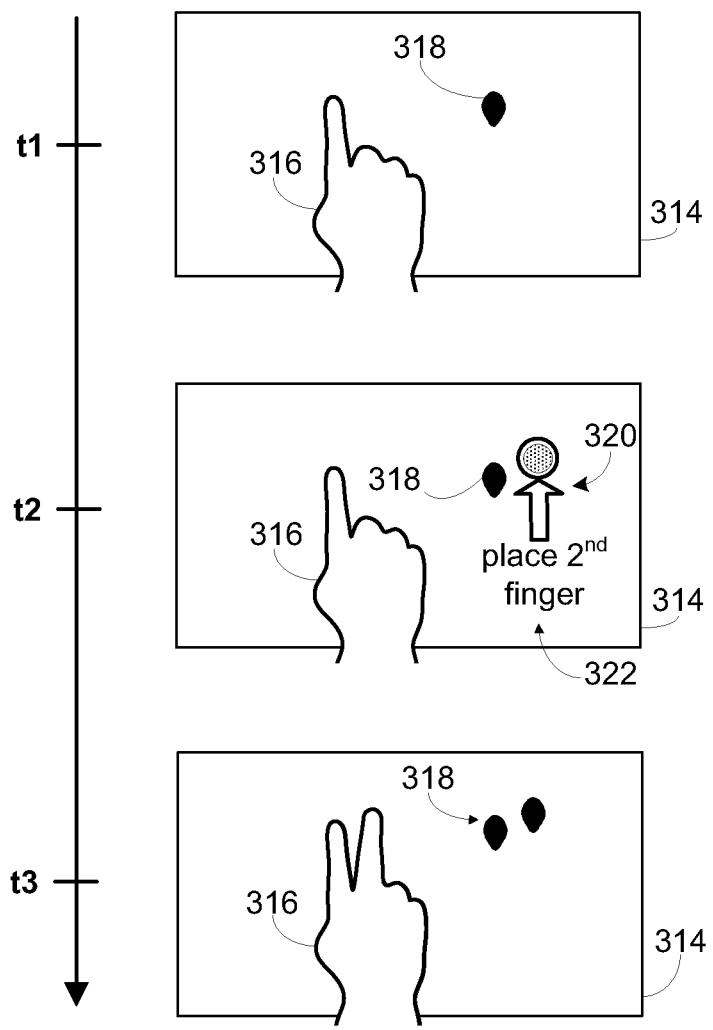
Figure 4:
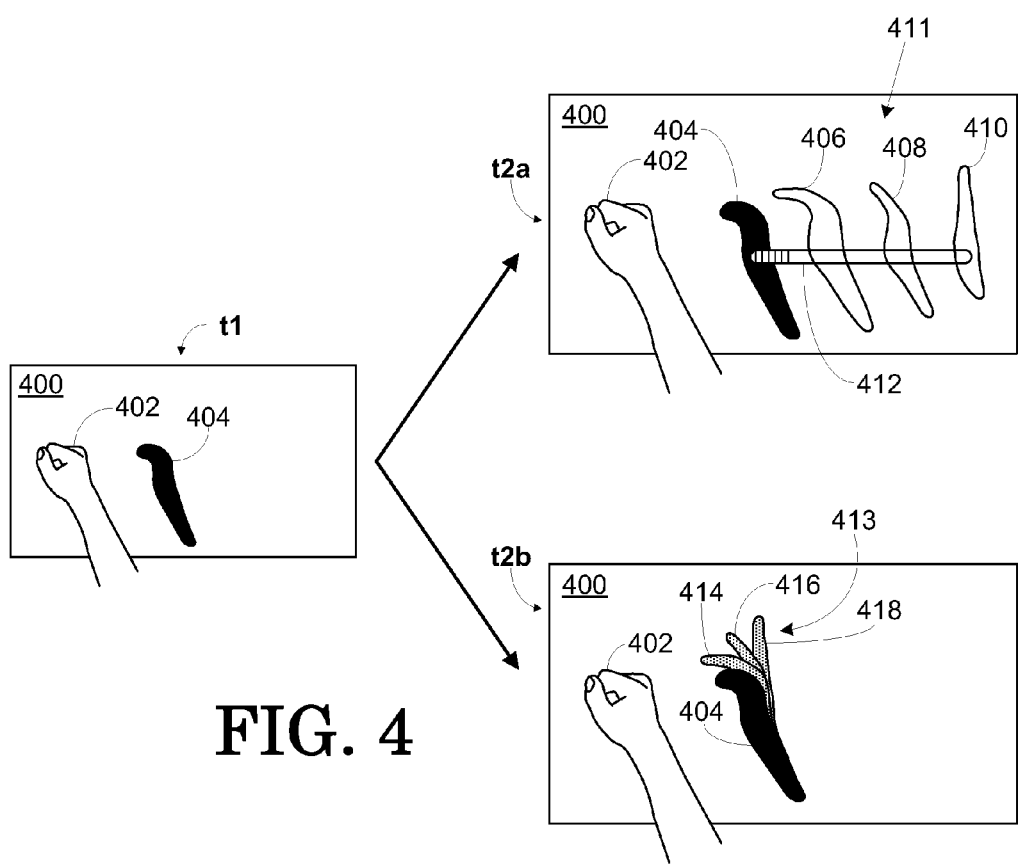
FIG. 4 shows examples of annotations proximate to an offset visualization of a touch input.
Figure 5:
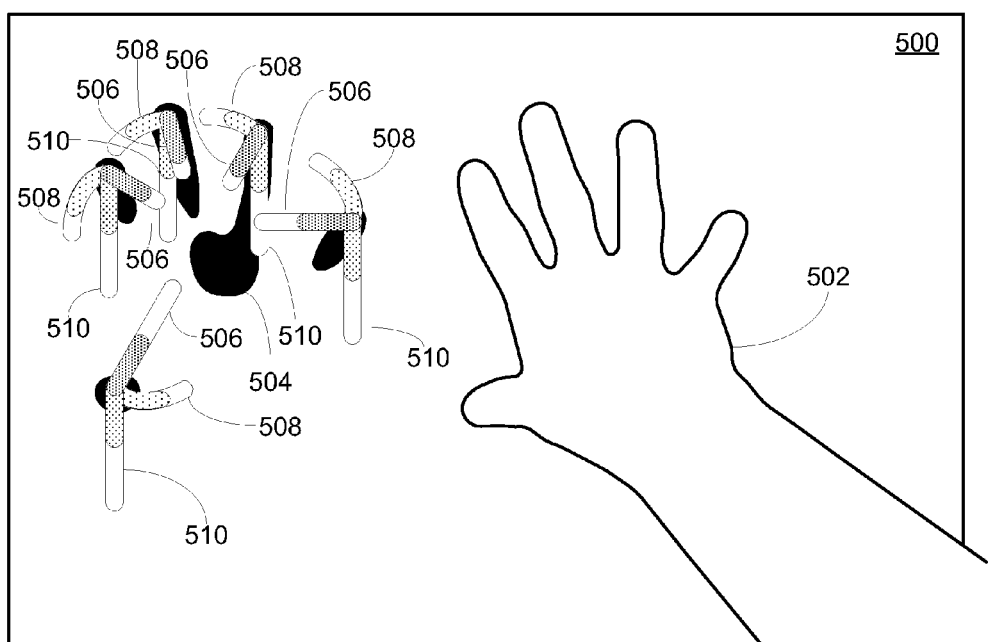
FIG. 5 shows an example of a plurality of annotations proximate to an offset visualization of a touch input.

FIGS. 3-5, described below, show various nonlimiting examples of annotated visualizations. These examples are provided to demonstrate concepts that may be applied to a variety of different annotations.

In FIG. 3A, an example touch input continuation guided by annotations is shown at successive times t1, t2, t3, and t4. In some examples, each legal touch input continuation may be mapped to a specific system action. Thus, different touch input continuations may result in different resulting system actions depending on which touch input continuations are performed by the user.

At t1, a user touch input 302 is performed on display surface 300 and an offset visualization 304 is displayed. User touch input 302 may be an initial touch of the surface, e.g., a user may initiate a touch input by touching the display surface, or touch input 302 may be a continuation of a previously started touch input. Offset visualization 304 may be displayed immediately upon initiation of touch input 302 or after touch input 302 fails to change by a predetermined rate, e.g., offset visualization 304 may be displayed in response to a pause or hesitation in movement of the touch input. Such pauses or hesitations in movement of a user's touch input may indicate that the user is uncertain of the possible legal continuations available from the current touch input. Thus, following a hesitation or pause in movement of the touch input, annotations may be displayed to guide the user. For example, the annotations may be displayed after the touch input fails to change at a predetermined rate.

At t2, a nonlimiting example of an annotation 311 is displayed. In this example, annotation 311 provides the user with a visual clue indicating that sliding a finger to the right across the display surface is a legal continuation of the touch input 302. In particular, annotation 311 includes an arrow 306 indicating a direction of the legal continuation of the touch input 302, a circle 308 indicating a destination of the legal continuation of the touch input 302, and a progress bar 312 indicating a level of completion of the continuation of the touch input 302. As shown, annotation 311 is displayed with a spatial connection to offset visualization 304. Because offset visualization 304 effectively mirrors touch input 302, annotation 311 shows the user how to move touch input 302 to execute the legal continuation of the touch input.

At t3, the progress bar 312 changes to visually indicate a relative level of completion of the legal continuation of the touch input as the user slides a finger across display surface 300 in accordance with annotation 311. The destination marker, circle 308, remains visible in order to continue guiding the user.

At t4, the user has moved offset visualization 304 to the location previously occupied by the destination marker, circle 308. The progress bar 312 is completely shaded, thus indicating that the legal continuation has been completed. In some examples, some or all of the annotations may be hidden upon completion of the associated touch input continuations. For example, arrow 306, circle 308, and/or progress bar 312 may be hidden upon completion of the legal continuation shown in FIG. 3A. In the illustrated scenario, arrow 306 and circle 308 are hidden, while progress bar 312 remains visible.

Upon completion of the legal touch input, the computing system may respond by performing the system action that is mapped to that touch input. In this way, the offset visualization 304 and annotation 311 may be used to teach a user how to use touch input to effectuate a particular system action. Different annotations may be presented in response to different touch inputs, so that different legal continuations and resulting system actions may be taught to the user.

As an example, FIG. 3B shows another example in which annotations are used with offset visualizations of touch contact points to teach a user a legal continuation of a touch input. In contrast to the example shown in FIG. 3A, where the legal continuation of a one-finger touch gesture was a finger slide, the legal continuation of the one-finger touch gesture of FIG. 3B includes touching a second finger against the display surface. It is to be understood that the examples of FIG. 3A and FIG. 3B are nonlimiting.

At t1 of FIG. 3B, a user touch input 316 is displayed on a display surface 314 and an offset visualization 318 is displayed.

At t2, an annotation 320 is displayed to guide the user to place a second finger on the display surface next to the first finger. Annotation 320 further includes textual information 322 describing how the legal continuation may be executed—in this case by placing a second finger down on the display surface. Such textual information may be incorporated into virtually any annotation.

At t3, a second finger is placed on the surface, and annotations 320 are hidden.

The examples provided in FIG. 3A and FIG. 3B show how different annotations may be used to teach a user different touch gestures. While not shown, it is to be understood that the computing system may perform one or more system actions responsive to the successful completion of such a touch gesture. For example, touch input 302 of FIG. 3A may be used to move a virtual object to the right, and touch input 316 of FIG. 3B may be used to select a virtual object. System actions may be mapped to touch gestures in any suitable way.

In addition to teaching a user how to complete a legal continuation of a touch input, annotations may optionally include visual information indicating the outcome of performing the legal continuation. For example, an annotation may include an image of a sliding virtual object or a textual description stating, "use two fingers to select."

FIG. 4 shows how annotations may be used to teach a user how to perform touch gestures that include changing hand postures. At t1, a user touches a display surface 400 with a first hand posture 402, and a contact silhouette 404 is displayed to provide the user with visual feedback as to which portions of the user hand are in contact with display surface 400. The contact silhouette is offset from the touch input, thus avoiding occlusion by the hand performing the touch gesture.

At t2a and t2b, FIG. 4 shows different examples of annotations that may be used to guide the user through different legal continuations of touch gestures including first hand posture 402. In particular, the example annotations show the user how the hand posture is to be changed throughout the touch gesture. The example annotations include images simulating the touch gesture throughout successive time frames. In other words, the annotations indicate legal continuations of the touch gesture by showing the user how hand posture is to be changed.

At t2a, example annotation 411 includes image 406, image 408, and image 410, each of which shows a different hand posture to be performed at successive time frames. In this example, not only is the hand posture to change, as indicated by the shapes of the images, but the overall position of the hand is to move, as indicated by the positions of the images. In particular, annotation 411 teaches that a legal continuation of the touch gesture is performed by sliding the hand to the right while opening the fingers of the hand. A progress bar 412 is displayed to indicate a level of completion of the gesture. Progress bar 412 may also provide directional information to indicate the direction a continuation of the touch input is to move. For example, progress bar 412 is oriented in the direction that the touch input should move and indicates a path to complete the legal continuation.

At t2b, example annotation 413 includes image 406, image 408, and image 410, which partially overlap contact silhouette 404 to indicate that a legal continuation of the touch gesture does not include moving the hand across the touch display. Instead, annotation 413 teaches that a legal continuation of the touch gesture is performed by opening the fingers of the hand while the hand remains in place. In such cases, where two or more images at least partially overlap, one or more of the images may be at least partially transparent.

FIGS. 3A, 3B, and 4 each show an example in which an annotation corresponding to a single continuation is displayed exclusive of other annotations corresponding to other continuations. In some embodiments, the computing system may display the annotation corresponding to the continuation that is believed to be the most likely continuation desired by the user. The likelihood that a continuation will be desired may be determined by the context of the use environment, usage heuristics, or any other suitable technique. In some embodiments, different annotations may be displayed one after another. For example, annotation 311 from FIG. 3A may be displayed first, and if a user does not perform the annotated continuation, annotation 320 from FIG. 3B may replace annotation 311.

In some embodiments, two or more annotations corresponding to two or more different continuations may be displayed at the same time. FIG. 5 shows an example where a plurality of different annotations (e.g., annotation 506, annotation 508, and annotation 510) are displayed at the same time. Each of the annotations corresponds to a different legal continuation of the touch input 502.

The touch input 502 shown in the example in FIG. 5 includes contact-shape touch input of multiple regions of a user's fingers, thumb and palm on the display surface. The visualization 504 is shown in black at a location of the surface offset from the touch input 502.

Each of the different annotations may be a different color in order to help the user distinguish between the different annotations.

In the example of FIG. 5, annotation 506 guides the user to bring the contact regions of the fingers and thumb toward a center portion of the hand while maintaining contact with the surface. The annotation 508 guides the user to rotate the contact regions of the fingers and thumb in a counterclockwise direction while maintaining contact with the surface. The annotation 510 guides the user to slide the contact regions of the fingers and thumb in a common direction, e.g., towards a bottom portion of the surface, while maintaining contact with the surface.

In the example of FIG. 5 the annotations are displayed as paths to guide the user. The paths further include progress information as indicated by shaded regions of the paths. The shaded regions may provide directional information as well as indicating a level of completion of the particular gesture. In this example, the user may choose one or any combination of the gestures to complete a legal continuation of the touch input 502. For example, the user may rotate the contact regions of the fingers and thumb in a counterclockwise direction only. In another example, the user may perform all three movements simultaneously, e.g., the user may rotate the contact regions of the fingers and thumb while closing the fingers and thumb and sliding the fingers and thumb toward a bottom portion of the display surface. In this example, all the annotations may remain visible to the user throughout a continuation of the touch input since each legal continuation may be performed in combination with one or more of the other legal continuations.

It is to be understood that the examples provided above are not limiting. Furthermore, the individual aspects described in each example may be combined. For example, the textual information 322 from FIG. 3B may be incorporated with the temporally overlapping display of two or more annotations from FIG. 5.

Figure 6:
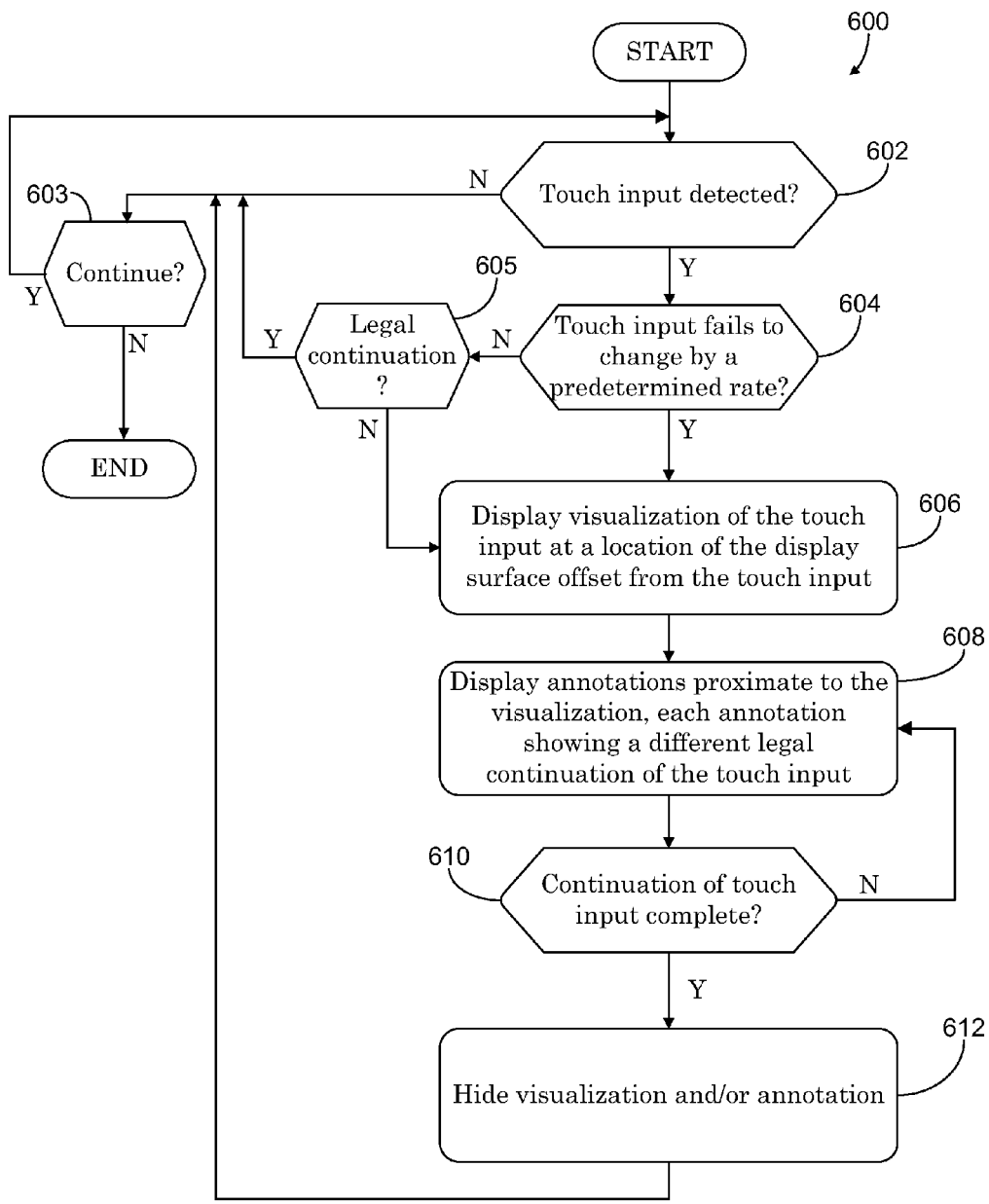
FIG. 6 shows an example method for providing touch input training on a display surface.

FIG. 6 shows an example method 600 for providing touch input training on a display surface by displaying annotations proximate to an offset visualization of a touch input to guide a user to perform legal continuations of the touch input.

At 602, method 600 includes determining if a touch input is detected. For example, a user may initiate a touch input by touching the display surface. In another example, a touch input may be detected at any time during a continuation of a touch input following an initial touch of the surface.

If the answer at 602 is no, flow moves to 603, where it is determined if the method should continue. If the answer at 603 is yes, flow moves back to 602. If the answer at 603 is no, the method ends.

If the answer at 602 is yes, flow moves to 604. At 604, method 600 includes determining whether the touch input identified at step 602 fails to change by a predetermined rate. The predetermined rate may be stored in a data-holding subsystem of the computing system with the display device. In some embodiments, the predetermined rate may be modified by a user.

If the answer at 604 is no, flow moves to 605. If the answer at 604 is yes, flow moves to 606, where touch input training is initiated. For example, touch input training may be initiated in response to a hesitation or pause in the touch input. In this way, an experienced user may complete a hand gesture without initiating touch input training. In another example, a novice or infrequent user may initiate a touch input and then pause to initiate the touch input training. In still another example, an intermediate user may be unfamiliar with a particular hand gesture and pause while performing the touch input to initiate the touch input training.

At 605, method 600 includes determining whether the changing touch input is a legal continuation of the touch input. If the answer at 605 is yes, flow moves to 603. If the answer at 605 is no, flow moves to 606, where touch input training is initiated. For example, a user may perform an illegal continuation of a touch input at which point the touch input training may be initiated.

At 606, upon initiation of touch input training, method 600 displays a visualization of the touch input at a location of the display surface offset from the touch input. As described above, the visualization may be a contact silhouette of one or more regions of one or more hands (or other objects) in contact with the display surface. The visualization of the touch input may include a contact silhouette showing which portions of an input object performing the touch input are in contact with the display surface. The visualization may be offset from the contact point of the contact-shape touch input so as to avoid occlusion by the touch input. In some examples, the offset visualization may include a schematic representation of regions of a touch input in contact with the display surface. In another example, the offset visualization may include a silhouette or shadow replicating the actual contact regions of a touch input as perceived by the system.

At 608, method 600 displays annotations proximate to the offset visualization, where each annotation shows a legal continuation of the touch input. The annotations may include information indicating a direction a continuation of the touch input should move to execute a legal continuation of the touch input, e.g., the information may include an arrow or path. The annotations may include a progress bar indicating a level of completion of a continuation of the touch input. The annotations may be color coded, e.g., a first annotation may be displayed with a first color and a second annotation displayed with a second color different from the first color, the first annotation indicating a first legal continuation of the touch input, and the second annotation indicating a second legal continuation of the touch input, different from the first legal continuation of the touch input. The annotations may include one or more images simulating a touch input at a corresponding one or more successive time frames to indicate a legal continuation of the touch input. The annotations may include textual information describing a legal continuation of the touch input and/or information describing the outcome of performing continuation.

At 610, method 600 determines if a continuation of touch input is complete. If the answer at 610 is no, flow may move back to 608, where an offset visualization with annotations to guide the user to complete a legal continuation of the touch input may continue to be displayed on the display surface. However, the displayed annotations may change depending on a level of completion of a legal continuation of the touch input. For example, a first set of annotations may be displayed based on a first touch input and a second set of annotations different from the first set of annotations may be displayed based on a second subsequent touch input. The method 600 may include continually updating the displayed annotations during a performance of a continuation of the touch input.

If the answer at 610 is yes, flow moves to 612. At 612, upon completion of the touch input, method 600 includes hiding the visualization and/or annotation. Method 600 may optionally include notifying the user to discontinue the touch input. For example, textual information, symbols, and/or icons may be displayed on the surface instructing the user to remove the touch input. Flow then moves to 603 where it is determined if the method is to be continued.

Figure 7:
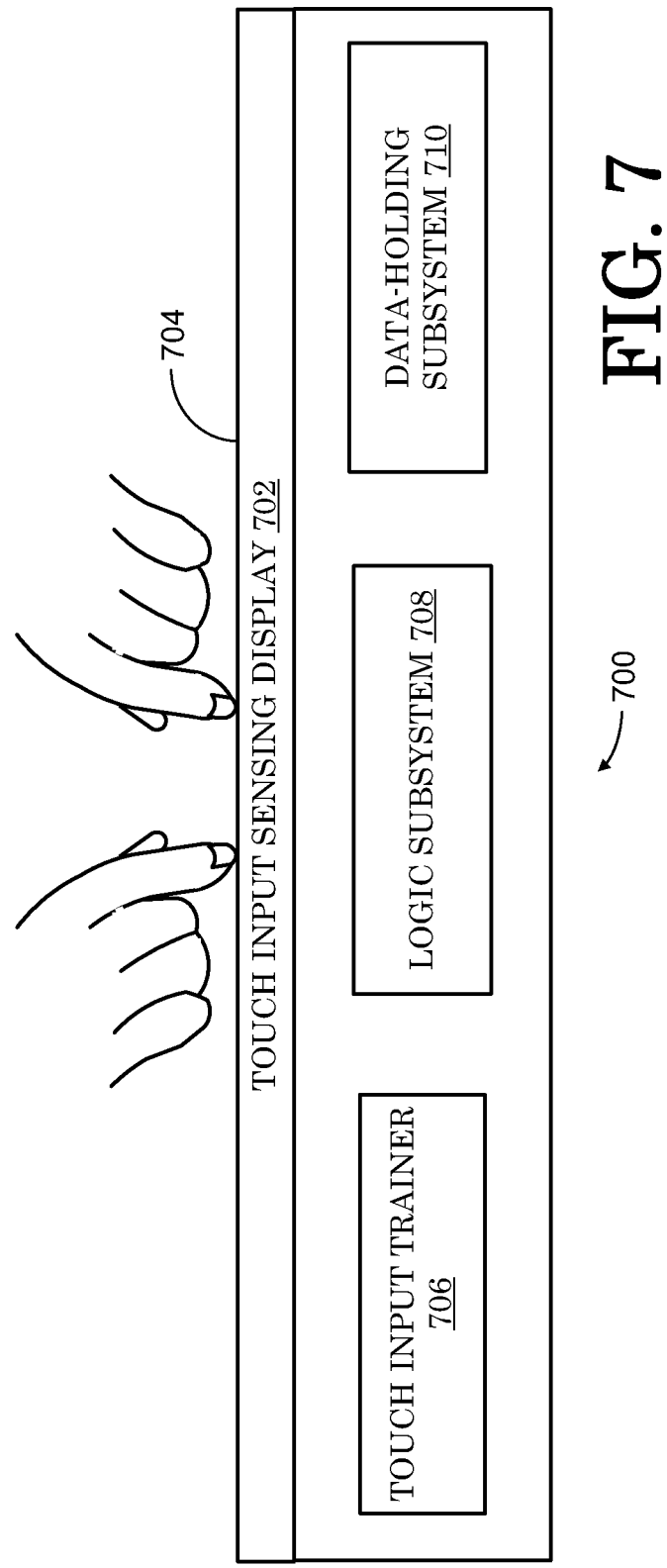
FIG. 7 schematically shows an example embodiment of a computing device including a touch input sensing display configured to detect multi-touch user input on a display surface.

The above described methods and processes may be tied to a computing device. FIG. 7 shows a schematic depiction of an example computing device 700 including a touch input sensing display 702 configured to visually present images to a user and detect contact-shape touch input on the display surface 704. The touch input sensing display 702 may be any suitable touch display, nonlimiting examples of which include touch-sensitive liquid crystal displays, touch-sensitive organic light emitting diode (OLED) displays, and rear projection displays with infrared, vision-based, touch detection cameras. The touch input sensing display 702 may be configured to detect user-input of various types. For example, contact-shape touch input by one or more users via one or more objects contacting display surface 704. Examples include, hand contact input, stylus contact input, etc.

The computing device 700 may further include a touch input trainer 706 operatively connected to touch input sensing display 702. The touch input trainer may be configured to display a visualization of a touch input at a location of the display surface 704 offset from the touch input and display one or more annotations at a location of the display surface offset from the touch input and proximate to the visualization, as described above. In this way, the touch input trainer 706 may guide a user of computing device 700 to complete a legal continuation of the touch input.

Computing device 700 includes a logic subsystem 708 and a data-holding subsystem 710. Logic subsystem 708 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem 708 may optionally include individual components that are distributed throughout two or more devices, which may be remotely located in some embodiments. Furthermore the logic subsystem 708 may be in operative communication with the touch input sensing display 702 and the touch input trainer 706.

Data-holding subsystem 710 may include one or more physical devices configured to hold data and/or instructions executable by the logic subsystem to implement the herein described methods and processes. When such methods and processes are implemented, the state of data-holding subsystem 710 may be transformed (e.g., to hold different data). Data-holding subsystem 710 may include removable media and/or built-in devices. Data-holding subsystem 710 may include optical memory devices, semiconductor memory devices, and/or magnetic memory devices, among others. Data-holding subsystem 710 may include devices with one or more of the following characteristics: volatile, nonvolatile, dynamic, static, read/write, read-only, random access, sequential access, location addressable, file addressable, and content addressable. In some embodiments, logic subsystem 708 and data-holding subsystem 710 may be integrated into one or more common devices, such as an application specific integrated circuit or a system on a chip.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-implemented method for providing hand gesture training on a display surface, comprising:
   detecting a hand gesture on the display surface;
   displaying a contact silhouette showing, at a location of the display surface offset from the hand gesture, only regions of a hand performing the hand gesture that are in contact with the display surface while not showing other regions of the hand that are not in contact with the display surface;
   responsive to displaying the contact silhouette, determining with a logic subsystem one or more possible legal hand gesture continuations based on the detected hand gesture; and
   displaying one or more annotations corresponding to the one or more possible legal hand gesture continuations proximate to the contact silhouette, each annotation showing a different legal hand gesture continuation, where the contact silhouette and the one or more annotations proximate to the contact silhouette are displayed after the hand gesture fails to change at a predetermined rate as recognized by the logic subsystem.

2. The method of claim 1, further comprising hiding the contact silhouette and the one or more annotations proximate to the contact silhouette upon completion of the hand gesture.

3. The method of claim 1, where the one or more annotations includes a first annotation displayed with a first color and a second annotation displayed with a second color different from the first color, the first annotation indicating a first legal continuation of the hand gesture, and the second annotation indicating a second legal continuation of the hand gesture, different from the first legal continuation of the hand gesture.

4. The method of claim 1, where the one or more annotations includes one or more images simulating a hand gesture at a corresponding one or more successive time frames to indicate a legal continuation of the hand gesture.

5. The method of claim 1, where the one or more annotations includes a progress bar indicating a level of completion of a continuation of the hand gesture.

6. The method of claim 1, wherein displaying one or more annotations proximate to the contact silhouette comprises:
   displaying a first annotation proximate to the contact silhouette showing a first legal hand gesture continuation; and
   if a subsequent hand gesture corresponding to the first legal hand gesture continuation is not detected within a threshold amount of time, then removing the first annotation and displaying a second annotation proximate the contact silhouette showing a second legal hand gesture continuation, different than the first legal hand gesture continuation.

7. A computer-implemented method for providing hand gesture training on a display surface, comprising:
   detecting a hand gesture on the display surface performed by a hand of a user;
   displaying a contact silhouette showing, at a location of the display surface offset from the hand gesture, only regions of the hand performing the hand gesture that are in contact with the display surface while not showing other regions of the hand that are not in contact with the display surface;
   responsive to displaying the contact silhouette, determining with a logic subsystem one or more possible legal hand gesture continuations based on the detected hand gesture;
   responsive to the hand gesture failing to change at a predetermined rate as recognized by the logic subsystem, displaying one or more annotations corresponding to the one or more possible legal hand gesture continuations proximate to the contact silhouette, each annotation showing a different legal hand gesture continuation; and
   hiding the contact silhouette upon completion of a legal continuation of the hand gesture as recognized by the logic subsystem.

8. The method of claim 7, wherein the one or more annotations includes information indicating a direction a continuation of the hand gesture should move to execute a legal continuation of the hand gesture.

9. The method of claim 8, wherein the information indicating a direction a continuation of the hand gesture should move to execute a legal continuation of the hand gesture includes an arrow.

10. The method of claim 8, wherein the information indicating a direction a continuation of the hand gesture should move to execute a legal continuation of the hand gesture includes a path.

11. The method of claim 7, wherein the one or more annotations includes a first annotation displayed with a first color and a second annotation displayed with a second color different from the first color, the first annotation indicating a first legal continuation of the hand gesture, and the second annotation indicating a second legal continuation of the hand gesture, different from the first legal continuation of the hand gesture.

12. The method of claim 7, wherein the one or more annotations includes one or more images simulating a hand gesture at a corresponding one or more successive time frames to indicate a legal continuation of the hand gesture.

13. The method of claim 7, wherein the one or more annotations includes textual information describing a legal continuation of the hand gesture.

14. The method of claim 7, wherein one or more of the contact silhouette and the one or more annotations includes a progress bar indicating a level of completion of a continuation of the hand gesture.

15. The method of claim 7, further comprising providing a notification to discontinue the hand gesture upon completion of a continuation of the hand gesture.

16. A computing system, comprising:
   a display surface configured to receive touch input;

a logic subsystem operatively connected to the display surface; and a data-holding subsystem holding instructions executable by the logic subsystem to:

detect a hand gesture on the display surface;

display a contact silhouette showing, at a location of the display surface offset from the hand gesture, only regions of a hand performing the hand gesture that are in contact with the display surface while not showing other regions of the hand that are not in contact with the display surface; and display a first annotation proximate to the contact silhouette showing a first legal hand gesture continuation; and if a subsequent hand gesture corresponding to the first legal hand gesture continuation is not detected within a threshold amount of time, then removing the first annotation and displaying a second annotation proximate the contact silhouette showing a second legal hand gesture continuation, different than the first legal hand gesture continuation.

\* \* \* \* \*